United States Patent [19]

Southworth et al.

[11] Patent Number: 4,514,753

[45] Date of Patent: Apr. 30, 1985

[54] SPECTRUM CONSERVATION IN ENCODED COLOR TV SIGNALS

[75] Inventors: Glen R. Southworth, Boulder; Bruce F. Johnson, Longmont, both of Colo.

[73] Assignee: Colorado Video, Incorporated, Boulder, Colo.

[21] Appl. No.: 438,679

[22] Filed: Nov. 3, 1982

[51] Int. Cl.³ ............................................. H04N 9/493
[52] U.S. Cl. .......................................... 358/11; 358/12
[58] Field of Search ................. 358/11, 12, 21 R, 310, 358/13

[56] References Cited

U.S. PATENT DOCUMENTS

| | | | |
|---|---|---|---|
| 3,284,567 | 11/1966 | Southworth | 358/138 |
| 3,683,111 | 8/1972 | Southworth | 358/138 |
| 3,950,607 | 4/1976 | Southworth | 358/134 |
| 4,318,120 | 3/1982 | Acampora | 358/11 |

Primary Examiner—Tommy P. Chin
Attorney, Agent, or Firm—O'Rourke & Harris

[57] ABSTRACT

Spectrum conservation in encoded color TV signals is disclosed. An encoded color video signal is orthogonally re-encoded to eliminate the high frequency color subcarrier component to enable transmission or recording of the resulting video signal without distortions in the amplitude or phase characteristics of the encoded color chrominance component as might be introduced without re-encoding of the signal. Re-encoding is achieved by orthogonally converting the incoming color video signal at a predetermined rate, and specific embodiments are disclosed for achieving an optimum orthogonal pattern of the color subcarrier information. After transmission or recording, the original high frequency color subcarrier information and picture luminance component is reconstructed in a video memory device. Orthogonal re-encoding is shown to be generally useful for re-encoding color TV signals including providing an orthogonally encoded color slow-scan TV signal without use of intermediate memory devices.

23 Claims, 14 Drawing Figures

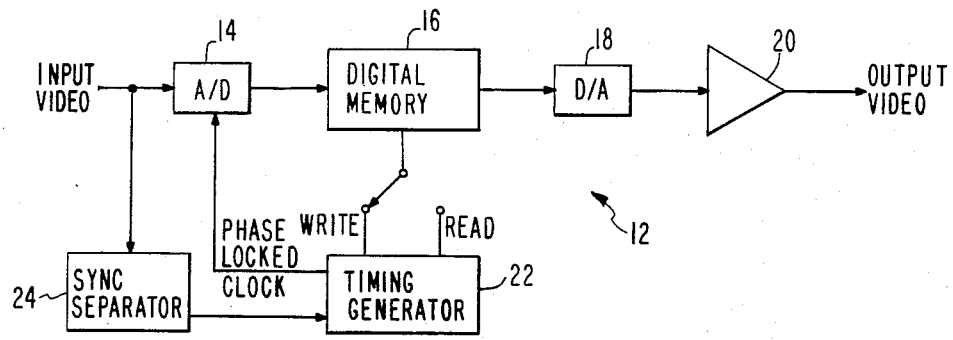
Fig_1
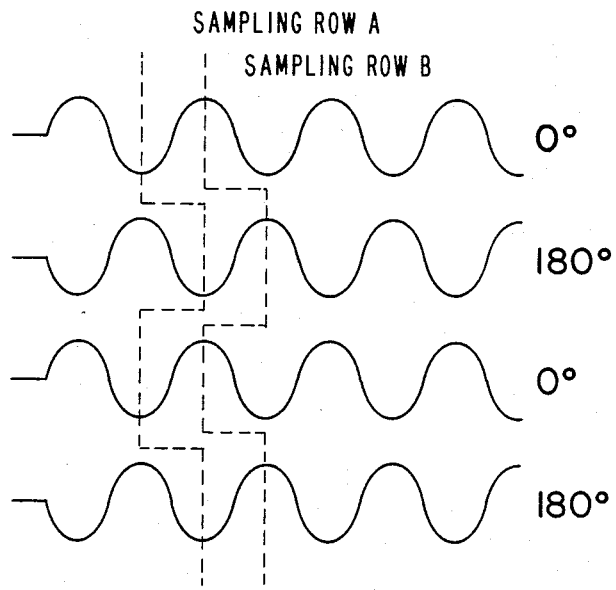
Fig_4a
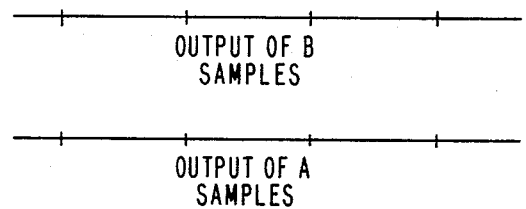
Fig_4b

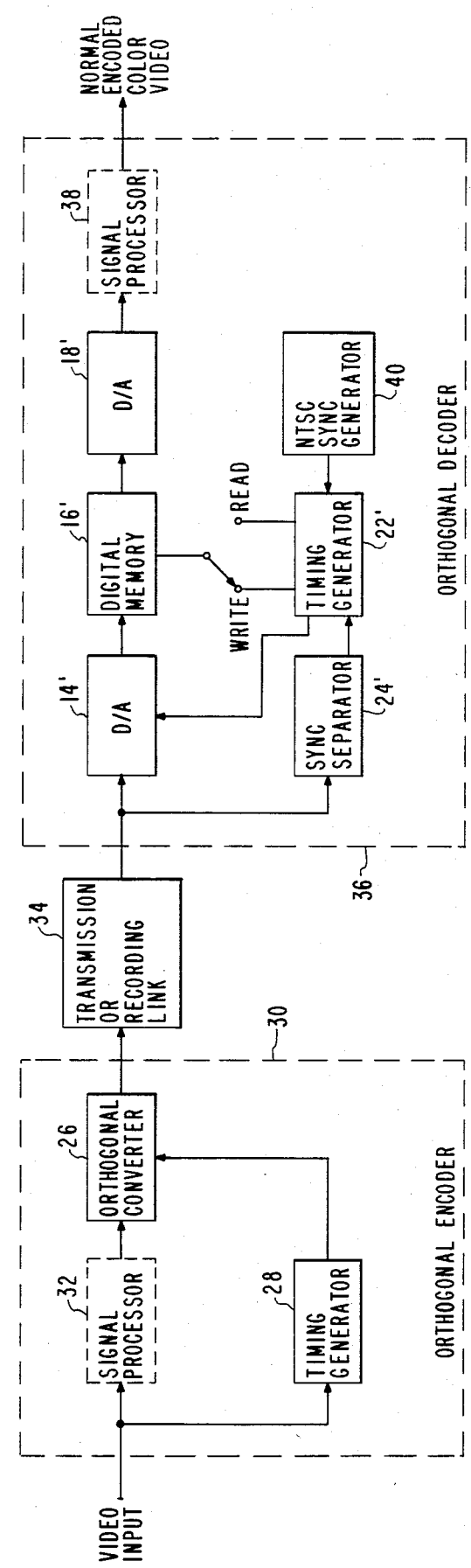
Fig_2

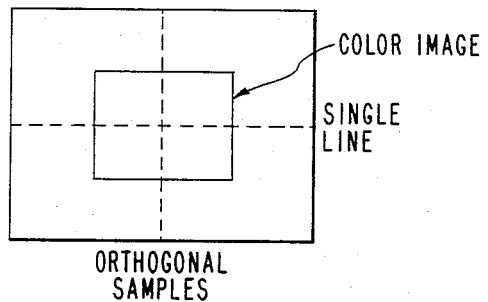
Fig_3a
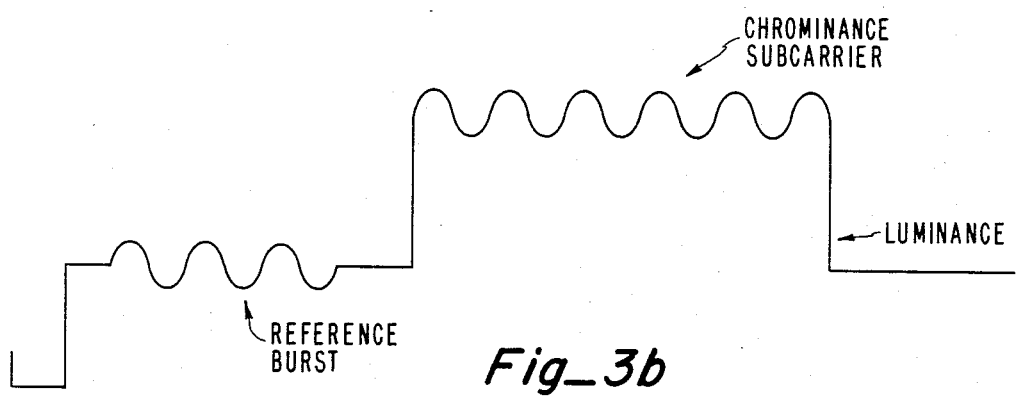
Fig_3b
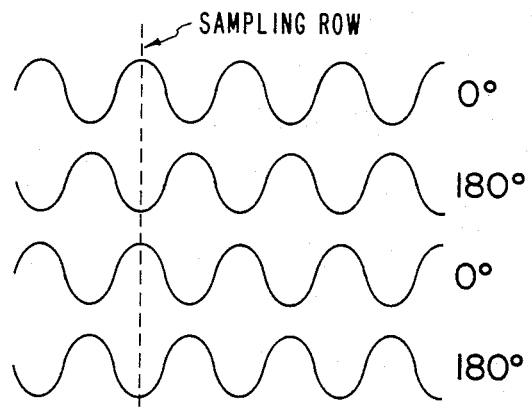
Fig_3c
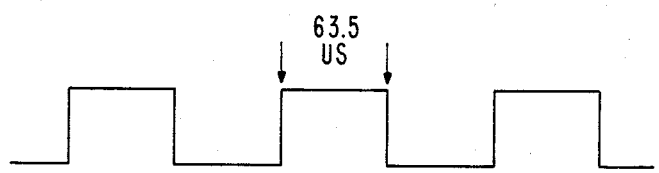
Fig_3d

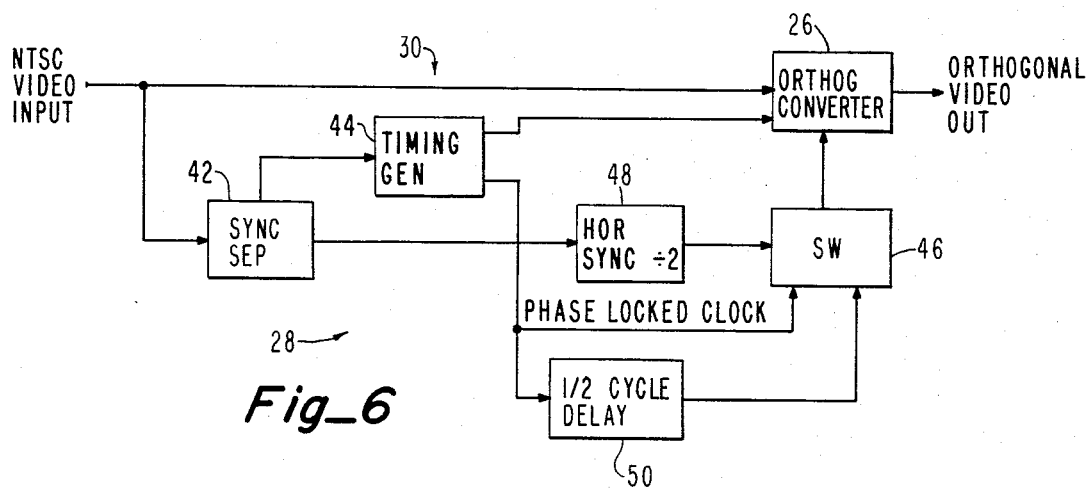
Fig_6
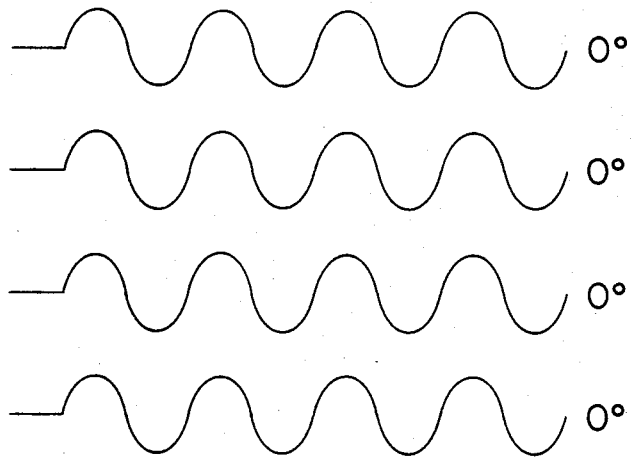
Fig_5a
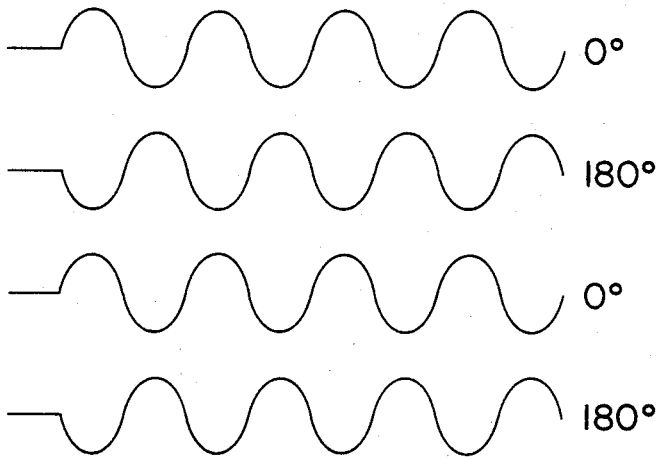
Fig_5b

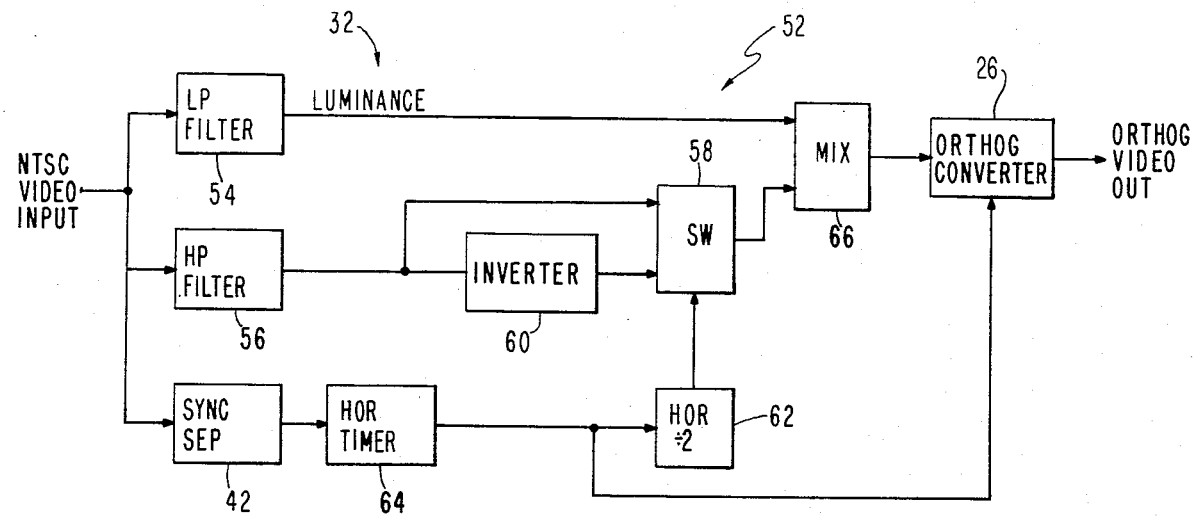
*Fig_7*
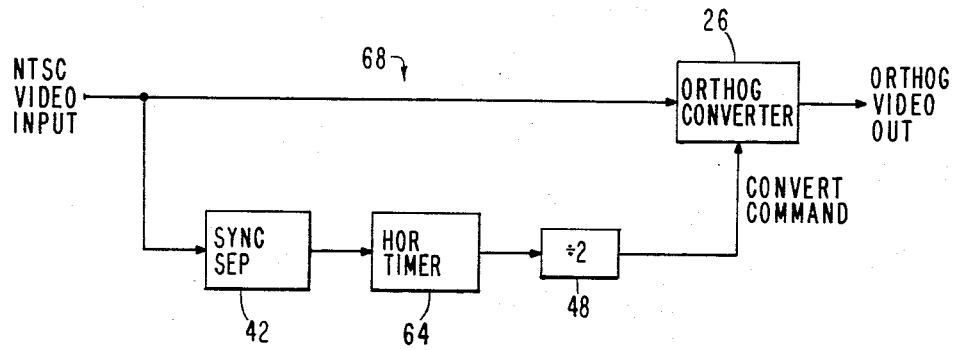
*Fig_8*
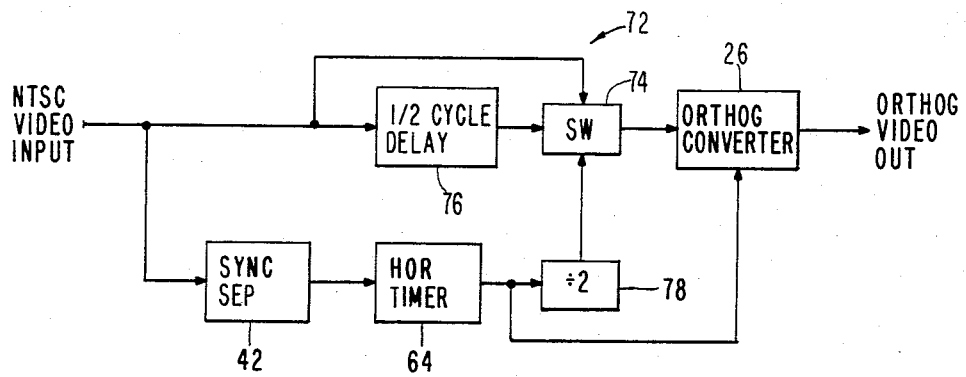
*Fig_9*

SPECTRUM CONSERVATION IN ENCODED COLOR TV SIGNALS

FIELD OF THE INVENTION

This invention relates to encoded color TV signal processing, and, more particularly, relates to conservation of the color subcarrier information during processing of an encoded color TV signal.

BACKGROUND OF THE INVENTION

The transmission or recording of conventionally encoded color television signals (either NTSC (US) or PAL (European)) is complicated by the fact that encoded color information is contained in a high frequency subcarrier that is close to the upper limit of the spectrum of video frequencies. As a consequence, particular care must be taken to ensure that the transfer process (i.e., transmission or recording) does not introduce frequency fluctuations or distortions in amplitude and phase characteristics of the encoded video signal. This has been a well recognized problem, and various attempts have heretofore been made to solve, or at least minimize, the problem, usually by some type, or process, of re-encoding the signal.

While it is now known that overall bandwidth may be conserved by a technique in which each individual line of video information is first recorded in some type of memory and then read out at a reduced rate to produce a "slow-scan" television signal, this technique does not solve the problem set forth hereinabove. In addition, while some "slow-scan" systems have heretofore employed orthogonal transformation techniques for generating slow-scan TV signals (see, for example, U.S. Pat. Nos. 3,284,567 and 3,683,111), such techniques have not heretofore been utilized to produce a completely effective and ecconomical means of re-encoding a conventional color TV signal for transmission or recording purposes, and refinements thereof were therefore felt to be useful.

SUMMARY OF THE INVENTION

This invention provides a device and method for enabling spectrum conservation of an encoded color TV signal during transmission or recording by orthogonally re-encoding the color TV signal in a manner so as to eliminate the high frequency color subcarrier component prior to transmission or recording, which component may then be reconverted after transmission or recording to provide the desired encoded color TV signal for utilization purposes.

It is therefore an object of this invention to provide a device and method that enables spectrum conservation of an encoded color TV signal, particularly during transmission or recording of the signal.

It is another object of this invention to provide a device and method for orthogonally re-encoding a color TV signal to facilitate spectrum conservation.

It is still another object of this invention to provide a device and method for orthogonally re-encoding a color TV signal to eliminate the high frequency color subcarrier.

It is still another object of this invention to provide a device and method for eliminating the high frequency color subcarrier of a color TV signal during transmission or recording and then restoring the subcarrier after transmission or recording thereby facilitating spectrum conservation.

It is yet another object of this invention to provide a device and method for orthogonally encoding a color TV signal to provide a slow-scan signal.

With these and other objects in view, which will become apparent to one skilled in the art as the description proceeds, this invention resides in the novel construction, combination, arrangement of parts and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings, together with the specification, illustrate complete embodiments of the invention according to the best mode so far devised for the practical application of the principles thereof, and in which:

FIG. 1 is a simplified block diagram of a video scan converter;

FIG. 2 is a simplified block diagram illustrating orthogonal re-encoding of a color TV signal to eliminate the color subcarrier prior to transmission or recording and restoring of the color subcarrier by orthogonal encoding after transmission or recording;

FIG. 3a is a typical representation of a single field of a color picture with a color square on a black background depicted;

FIG. 3b is a representation of the waveform of a single line of TV information (NTSC composite color signal) taken from the center of the field of the picture depicted in FIG. 3a;

FIG. 3c is a representation of a portion of four adjacent TV lines taken from the center of the field of the picture depicted in FIG. 3a to illustrate the alternation of phase in the color subcarrier frequency on a line-to-line basis;

FIG. 3d is a waveform illustrating the output produced by simple orthogonal sampling of a video signal as depicted in FIG. 3b;

FIG. 4a is similar to FIG. 3c, but illustrates the effect of delaying samples on alternate TV lines;

FIG. 4b illustrates that the original color information is retained as an amplitude variation on a row-to-row basis;

FIG. 5a illustrates the output of a decoder memory without alternate line delay;

FIG. 5b illustrates the output of a decoder memory with alternate line delay to illustrate restoration of the high frequency subcarrier original phase relationships after transmission or recording;

FIG. 6 is a block diagram showing the now preferred embodiment of the orthogonal re-encoding device of this invention wherein a one-half cycle of delay of the sampling signal is introduced on alternate TV lines in order to compensate for alternations in subcarrier phase;

FIG. 7 is a block diagram illustrating a second embodiment of the orthogonal re-encoding device of this invention wherein a 180° inversion of the subcarrier is made to occur on alternate lines;

FIG. 8 is a block diagram illustrating a third embodiment of an orthogonal re-encoding device of this invention wherein skip sampling on alternate lines is made to occur; and FIG. 9 is a block diagram illustrating a fourth embodiment of the orthogonal re-encoding device of this invention wherein a one-half cycle of delay is introduced on alternate lines.

DESCRIPTION OF THE INVENTION

Although orthogonal transformations of video signals may be made without the use of memory components, additional flexibility can be achieved by use of one or more memories capable of storing a single field or a full frame of encoded color video information. FIG. 1 is a simple block diagram of a typical video scan converter 12. As shown, the input video signal is coupled through analog-to-digital (A/D) converter 14 to a digital memory unit 16, and the output from digital memory unit 16 is coupled through digital-to-analog (D/A) converter 18 to amplifier 20 which provides the output video signal. Memory device 16 can consist of any medium such as magnetic disc, storage tube, delay lines, optical disc, etc., with the now preferred unit being a digital memory having random access memory components.

As also indicated in FIG. 1, digital memory unit 16 is controlled by timing generator 22. Timing generator 22 receives an input from sync separator 24 (connected with the video input as indicated in FIG. 1), and timing generator 22 also provides a phase locked clock signal to A/D converter 14. For purposes of this invention, A/D converter 14, digital memory unit 16, D/A converter 18 and amplifier 20 may be considered as an orthogonal converter unit 26 which is controlled by timing generator 28 to form an orthogonal encoding unit 30. As indicated in FIG. 2, orthogonal encoding unit 30 may include signal processing circuitry 32 as brought out more fully hereinafter. Orthogonal, as used herein, is meant to mean an occurrence at a right angle with respect to the original direction. For example, orthogonal sampling, as used herein, is meant to mean vertical row sampling.

With a digital memory (as shown in FIG. 1) capable of storing one frame of color encoded information, the memory may be read out at any desired rate of speed (either higher or lower than the original input signal) through digital-to-analog converter 18. If the contents of the digital memory are read out in the same format as they were read in, namely a TV line at a time, then the video signal may be either increased or decreased in speed, and the high frequency subcarrier component (of an NTSC or PAL color video signal) will remain present in its original relationship to the luminance component.

If the high frequency clock timing to A/D converter 14 and digital memory 16 (as shown in FIG. 1) is phase locked to the original input video signal and is set to an unvarying number of intervals per TV line (i.e., 512, 640, 768, etc.), then an orthogonal readout may be readily obtained. By proper control of the random access digital memory at any desired rate of speed, the analog output signal (i.e., the digital signal from the memory after being coupled through the D/A converter) may be then transferred (i.e., transmitted or recorded) at a suitable transmission or recording link 34, and then coupled to a decoder that includes a nearly identical equipment configuration to the encoder for reconversion to a signal meeting conventional TV standards.

As shown in FIG. 2, orthogonal decoder 36 includes an A/D converter 14', the output of which is coupled to digital memory unit 16'. The output from digital memory unit 16' is coupled through D/A converter 18' to signal processing unit 38 which provides the normal encoded color video output signal. Timing generator 22' controls digital memory 16' and provides a phase locked clock signal to A/D converter 14'. Timing generator 22' receives an input from sync separator 24' (connected to receive the video input signal) and an input from NTSC sync generator 40.

FIG. 3 illustrates diagramatically the relationships produced by orthogonal conversion of an NTSC color video signal. FIG. 3a shows a typical representation of a single field of a color picture with a color square setting upon a black background. FIG. 3b is a representation of the waveform of a single line of TV information taken from the center of the field shown in FIG. 3a. FIG. 3c is a representation of a portion of four adjacent TV lines taken from the center of the field shown in FIG. 3a, and illustrates the alternation of phase in the color subcarrier frequency on a line-to-line basis. FIG. 3d shows the resulting waveform produced by simple orthogonal sampling of the NTSC signal (as shown in FIG. 3b), and illustrates that a high frequency component, produced by the phase alternation of the color subcarrier, is still present.

By modifying the sampling process, the high frequency component of the color subcarrier may be essentially eliminated. FIG. 4a illustrates a simple method of accomplishing this by slightly delaying samples on alternate TV lines. The original color information, however, is retained as an amplitude variation on a row-to-row basis (as shown in FIG. 4b) so that the original high frequency color subcarrier can be restored (or reinserted) when the re-encoded signal is reconverted through a second memory device 16' in orthogonal decoder 36 (as shown in FIG. 2). As indicated in FIG. 5a, if the second memory unit 16' does not have a delay introduced, the color subcarrier information reproduced at the output of the memory unit will be of incorrect phase. But if, as indicated in FIG. 5b, the appropriate line-by-line delay is introduced, then the original high frequency color subcarrier phase relationships are restored.

Thus, by use of orthogonal scan transformation, the high frequency color subcarrier component can be converted to a much lower frequency and this means that the high frequency characteristics of the transmission or recording media are much less critical, and, if desired, high frequencies in the video signal may be attenuated without affecting color accuracy (although vertical resolution of the picture will be affected). In addition, high frequency phase shift is no longer critical in maintaining appropriate color hues and substantial frequency variations (such as found in inexpensive tape recorders, for example) may be tolerated.

A block diagram of the now preferred embodiment of orthogonal encoder 30 is shown in FIG. 6. As shown, the NTSC video input signal is coupled to orthogonal converter 26 and to sync separator 42 (of timing generator 28). The output from sync separator 42 is coupled to timing generator 44 which provides a phase locked clock output that is synchronized to the incoming video horizontal timing pulses. The clock pulse output from timing generator unit 44 is directly coupled to switch 46 in one path, and is coupled to switch 46 through one-half cycle delay unit 50 in a second path. Switch 46 also receives an output from horizontal sync divide-by-two (÷2) unit 48, which unit is connected to receive an output from sync separator 42. The result is that switch 46 introduces a small controlled delay of the timing pulses on alternate TV lines in order to sample a constant subcarrier phase.

FIG. 7 illustrates a second embodiment 52 of the orthogonal encoder. As shown, the color subcarrier component is separated from the luminance component in processing circuitry 32 by use of low pass filter 54 (for luminance separation) and high pass filter 56 (for chroma separation) with the color subcarrier component being then passed through circuitry that produces a 180° phase reversal (or inversion) on every other TV line (which is accomplished through switch 58 which receives the color subcarrier component directly in one path and through inverter 60 in a second path, with switch 58 also receiving an output from horizontal divide-by-two (÷2) unit 62 connected with horizontal timing unit 64 of timing generator 28). The subcarrier component is then recombined with the luminance component at mixer 66 for subsequent orthogonal processing at orthogonal converter 26.

FIG. 8 illustrates a third embodiment 68 of the orthogonal encoder. As shown, every second orthogonal sample is converted (i.e., skip sampling of alternating lines). This is readily accomplished by coupling the output of divide-by-two (÷2) circuit 48 directly to orthogonal converter 26. This has the disadvantage, however, of producing a less redundant data stream and generating an orthogonal signal having a "line" rate twice as high as normal.

As shown in FIG. 9 as a fourth embodiment 72 of the orthogonal encoder, the incoming video signal is coupled to switch 74 along with the incoming video signal delayed by one-half cycle at one-half cycle delay 76. Switch 74 is controlled by the output from divide-by-two (÷2) unit 78 which receives an input from horizontal timing unit 64. The result is a one-half cycle delay of the analog video signal on alternate lines which occurs in the same general manner as obtained with respect to the embodiment shown in FIG. 6.

If only stationary encoded color images are to be transmitted in a "slow-scan" manner, the requirement for a transmitting field or frame store device may be eliminated by means of minor changes in the orthogonal sampling pattern. For example, if samples are taken from only every fourth, eighth, twelfth, or similar integer of the TV field rate, then an NTSC type color signal may be reconstructed in an appropriate receiving memory as described hereinabove. A divide-by-eight (÷8) pattern and subsequent buffering may be particularly desirable for telephone line transmission of slow-scan TV signals such as described, for example, in U.S. Pat. No. 3,950,607.

A slightly more complex sampling pattern than above would allow using data from every TV line, or multiple samples from each TV line. Other combinations and variations will be obvious from the foregoing, as is the application to both NTSC or PAL or other similar color TV encoding schemes.

From the foregoing, it is to be realized that this invention provides a device and method for spectrum conservation of encoded color TV signals by orthogonal re-encoding to eliminate the color subcarrier during transmission or recording.

What is claimed is:

1. A method for spectrum conservation of an encoded color TV signal, said method comprising:

providing an encoded color TV signal having a high frequency color subcarrier component;

re-encoding said color TV signal to eliminate the color subcarrier component, including said high frequency color subcarrier component therefrom;

transferring said re-encoded color TV signal by means of one of transmitting and recording; and reconstructing said color subcarrier component of said encoded TV signal after said transfer has been completed.

2. The method of claim 1 wherein said re-encoding of said color TV signal includes orthogonal scan transformation of said color TV signal, and wherein said reconstruction of said color subcarrier component includes orthogonal conversion of said re-encoded TV signal.

3. The method of claim 2 wherein said orthogonal scan transformation includes orthogonal conversion of TV lines of the incoming TV signal with a predetermined delay for alternate ones of said TV lines being provided to eliminate said color subcarrier component.

4. A method for processing an encoded color TV signal for spectrum conservation, said method comprising:

providing an encoded color TV signal having a high frequency color subcarrier component; and orthogonally re-encoding said encoded color TV signal to eliminate the high frequency color subcarrier component.

5. The method of claim 4 wherein said re-encoding of said color TV signal includes writing of said encoded color TV signal into a memory device and reading said re-encoded color TV signal from said memory device.

6. The method of claim 4 wherein said orthogonal re-encoding includes orthogonal conversion of TV lines from the incoming TV signal with a predetermined delay for alternate ones of said TV lines being provided to eliminate said color subcarrier component.

7. The method of claim 6 wherein said orthogonal re-encoding includes separating the color subcarrier component from the luminance component of the encoded color TV signal, inverting the color subcarrier component on every other TV line, and then mixing the color subcarrier component with the luminance component before said orthogonal conversion occurs.

8. The method of claim 6 wherein said orthogonal re-encoding includes skipping data from alternate lines of said encoded color TV signal.

9. The method of claim 4 wherein re-encoding of said signal includes producing a slow-scan output signal.

10. The method of claim 9 wherein said slow-scan output signal is achieved by taking samples only from each fourth, eighth, or twelfth field of said encoded color TV signal.

11. A device for spectrum conservation of an encoded color TV signal, said device comprising:

input means for receiving an encoded color TV signal having a high frequency color subcarrier component;

orthogonal encoding means connected with said input means for re-encoding said color TV signal, said orthogonal encoding means including means for eliminating said high frequency color subcarrier component;

transfer means for receiving said re-encoded signal from said orthogonal encoding means and transferring the same by one of transmission and recording; and orthogonal decoding means connected with said transfer means for receiving said re-encoded signal therefrom, said orthogonal decoding means including means for restoring said high frequency color subcarrier component into said color TV signal.

12. The device of claim 11 wherein said orthogonal encoding means including orthogonal converting means for converting said encoded TV signal by lines and wherein said device includes delay means for causing alternate ones of said lines to be delayed by one-half cycle whereby said high frequency color subcarrier component is eliminated at the output of said orthogonal converting means.

13. The device of claim 11 wherein said orthogonal encoding means includes means for providing a slow-scan re-encoded output signal.

14. The device of claim 13 wherein said slow-scan means includes means for causing conversion only from each fourth, eighth, or twelfth field of said encoded color TV signal.

15. An orthogonal encoding device, said device comprising:
input means for receiving an encoded color TV signal having a high frequency color subcarrier component;
orthogonal converter means connected with said input means for receiving said encoded color TV signal; and
timing means connected with said input means and said orthogonal converter means, said timing means causing said orthogonal converter means to convert said encoded color TV signal by rows and responsive thereto to provide a re-encoded color TV signal with said high frequency color subcarrier component eliminated therefrom.

16. The device of claim 15 wherein said encoded color TV signal includes video horizontal timing information, and wherein said timing means is connected with said input means so that said timing means is synchronized to said incoming video horizontal timing information provided in said encoded TV signal.

17. The device of claim 16 wherein said orthogonal converter means includes memory means whereby said encoded TV signal is read into said memory means and said re-encoded TV signal is read from said memory means.

18. The device of claim 15 wherein said timing means includes delay means for causing alternate ones of said lines of said TV signal to be delayed by one-half cycle of said encoded color TV signal.

19. The device of claim 18 wherein said timing means includes sync separator means connected with said input means, timing generator means connected with said sync separator means to provide phase locked clock timing pulses, horizontal sync divide-by-two means connected with said sync separator means, and switch means connected with said timing generator means and said horizontal sync divide-by-two means, with said delay means also being connected between said timing generator means and said switch means.

20. The device of claim 15 wherein said device includes signal processing means connected between said input means and said orthogonal converter means, said signal processing means including signal handling means and switching means for delaying alternate ones of said lines of said encoded color TV signal.

21. The device of claim 20 wherein said timing means includes sync separator means connected with said input means, horizontal timing means connected with said sync separator means and said orthogonal converter means, and divide-by-two means connected with said timing means and said switching means.

22. The device of claim 20 wherein said signal processing means includes filter means for separating the luminance and color subcarrier components of said encoded color TV signal, with said color subcarrier component being coupled through said signal handling means and said switching means, and said signal processing means also including mixing means connected with said filter means for receiving the luminance component of said encoded TV signal and said switching means for receiving the output therefrom, with said mixing means providing an output to said orthogonal converter means.

23. The device of claim 15 wherein said timing means includes sync separator means connected with said input means, horizontal timing means connected with said sync separator means, and divide-by-two means connected with said horizontal timing means, said divide-by-two means being connected with said orthogonal converter means whereby conversion occurs on only every other line of said encoded color TV signal.

* * * * *